(12) United States Patent
Song et al.

(10) Patent No.: US 11,152,150 B2
(45) Date of Patent: Oct. 19, 2021

(54) LC TANK CIRCUIT HAVING IMPROVED RESONANT FREQUENCY STABILITY AND FABRICATION METHOD THEREOF

(71) Applicant: Realtek Semiconductor Corp., Hsinchu (TW)

(72) Inventors: Fei Song, San Jose, CA (US); I-Chang Wu, Fremont, CA (US); Chia-Liang (Leon) Lin, Fremont, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 309 days.

(21) Appl. No.: 15/974,811

(22) Filed: May 9, 2018

(65) Prior Publication Data

US 2019/0348217 A1    Nov. 14, 2019

(51) Int. Cl.
  *H01F 27/40* (2006.01)
  *H01G 5/011* (2006.01)
  *H01F 27/29* (2006.01)

(52) U.S. Cl.
  CPC .............. *H01F 27/40* (2013.01); *H01F 27/29* (2013.01); *H01G 5/011* (2013.01)

(58) Field of Classification Search
  CPC .......... H01F 27/40; H01F 27/29; H01G 5/011
  See application file for complete search history.

(56) References Cited

U.S. PATENT DOCUMENTS

| 6,905,889 | B2   | 6/2005  | Lowther      |              |
|-----------|------|---------|--------------|--------------|
| 2004/0007760 | A1 | 1/2004  | Lowther      |              |
| 2006/0141978 | A1* | 6/2006 | Liu ............... | H03H 7/1766 455/333 |
| 2008/0071313 | A1* | 3/2008 | Stevenson ....... | A61N 1/3752 607/2 |
| 2008/0245543 | A1* | 10/2008 | El Rai .......... | H01L 23/5223 174/32 |
| 2012/0242446 | A1  | 9/2012  | Wu et al.    |              |
| 2018/0102738 | A1* | 4/2018  | Bi ............. | H03B 5/1228 |
| 2019/0103316 | A1* | 4/2019  | Leipold ....... | H01L 23/5227 |
| 2019/0272950 | A1* | 9/2019  | Maruthamuthu .. | H01G 4/005 |

* cited by examiner

*Primary Examiner* — Jue Zhang
(74) *Attorney, Agent, or Firm* — McClure, Qualey & Rodack, LLP

(57) ABSTRACT

A device includes a coil configured in a loop topology starting from a first end and extending to a second end, a pair of inward extension legs configured to extend from the first end and the second end toward an interior side of the coil to a third end and a fourth end, respectively, a pair of outward extension legs configured to extend from the first end and the second end toward an exterior side of the coil to a fifth end and a sixth end, respectively, a first capacitor configured to provide a capacitive coupling between the first end and the second end, a second capacitor configured to provide a capacitive coupling between the third end and the fourth end, and a third capacitor configured to provide a capacitive coupling between the fifth end and the sixth end.

10 Claims, 2 Drawing Sheets

US 11,152,150 B2

LC TANK CIRCUIT HAVING IMPROVED RESONANT FREQUENCY STABILITY AND FABRICATION METHOD THEREOF

BACKGROUND OF THE DISCLOSURE

Field of the Disclosure

The present disclosure generally relates to LC (inductor-capacitor) tank circuits, and more particularly to LC tank circuits having improved resonant frequency stability.

Description of Related Art

A LC (inductor-capacitor) tank comprises an inductor and a capacitor electrically connected by an interconnect metal to form a resonant network of a resonant frequency $f_0$ that can be mathematically expressed by the following equation:

$$f_0 = \frac{1}{2\pi\sqrt{LC}} \qquad (1)$$

Here, L is an inductance of the inductor and C is a capacitance of the capacitor. An issue of a LC tank is: the interconnect metal that is used to electrically connect the inductor to the capacitor becomes part of the inductor and may lead to an appreciable increase to the inductance, and thus appreciable downward shift of the resonant frequency. This issue is particularly troublesome when a physical dimension of the capacitor is large and a long interconnect metal is needed.

SUMMARY OF THE DISCLOSURE

In an embodiment, a device comprises: a coil configured in a loop topology starting from a first end and extending to a second end; a pair of inward extension legs configured to extend from the first end and the second end toward an interior side of the coil to a third end and a fourth end, respectively; a pair of outward extension legs configured to extend from the first end and the second end toward an exterior side of the coil to a fifth end and a sixth end, respectively; a first capacitor configured to provide a capacitive coupling between the first end and the second end; a second capacitor configured to provide a capacitive coupling between the third end and the fourth end; and a third capacitor configured to provide a capacitive coupling between the fifth end and the sixth end.

In an embodiment, a method comprises: laying out a coil configured in a loop topology starting from a first end and extending to a second end; laying out a pair of inward extension legs configured to extend from the first end and the second end toward an interior side of the coil to a third end and a fourth end, respectively; laying out a pair of outward extension legs configured to extend from the first end and the second end toward an exterior side of the coil to a fifth end and a sixth end, respectively; laying out a first capacitor to capacitively couple the first end to the second end; laying out a second capacitor to capacitively couple the third end to the fourth end; and laying out a third capacitor to capacitively couple the fifth end to the sixth end.

DETAILED DESCRIPTION OF THIS DISCLOSURE

The present disclosure is directed to LC tank circuits. While the specification describes several example embodiments of the disclosure considered favorable modes of practicing the invention, it should be understood that the disclosure can be implemented in many ways and is not limited to the particular examples described below or to the particular manner in which any features of such examples are implemented. In other instances, well-known details are not shown or described to avoid obscuring aspects of the disclosure.

Persons of ordinary skill in the art understand terms and basic concepts related to microelectronics that are used in this disclosure, such as "coil," "inductor," "capacitor," "LC tank," "variable capacitor," "electric energy," "magnetic energy," "current," "voltage," "inductance," "capacitance," "resonant tank," "resonant frequency," "varactor," "switch," "logical signal." Terms and basic concepts like these are apparent to those of ordinary skill in the art and thus need not be explained in detail here.

This disclosure is presented in an engineering sense, instead of a rigorous mathematical sense. For instance, "A is zero" means "A is smaller than a given engineering tolerance"; "A is equal to B" means "a difference between A and B is smaller than a given engineering tolerance."

Figure 1:
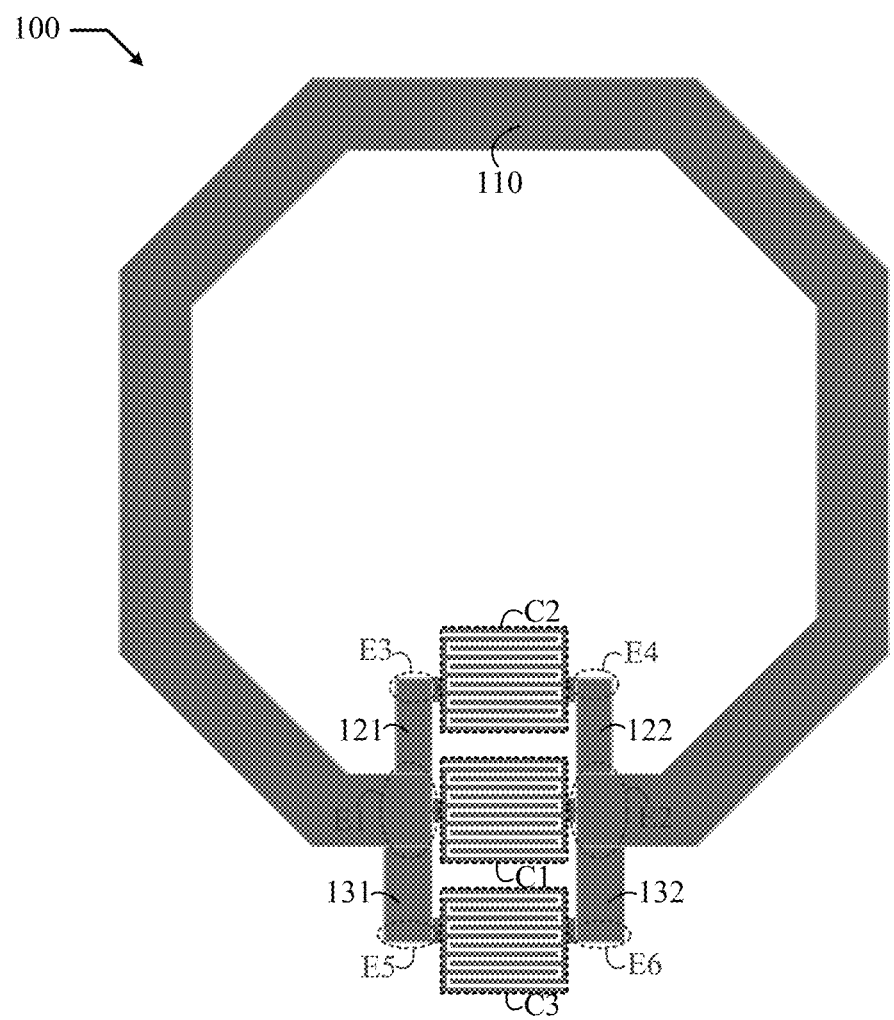
FIG. 1 shows a top view of a LC tank in accordance with an embodiment of the present disclosure.
Figure 2:
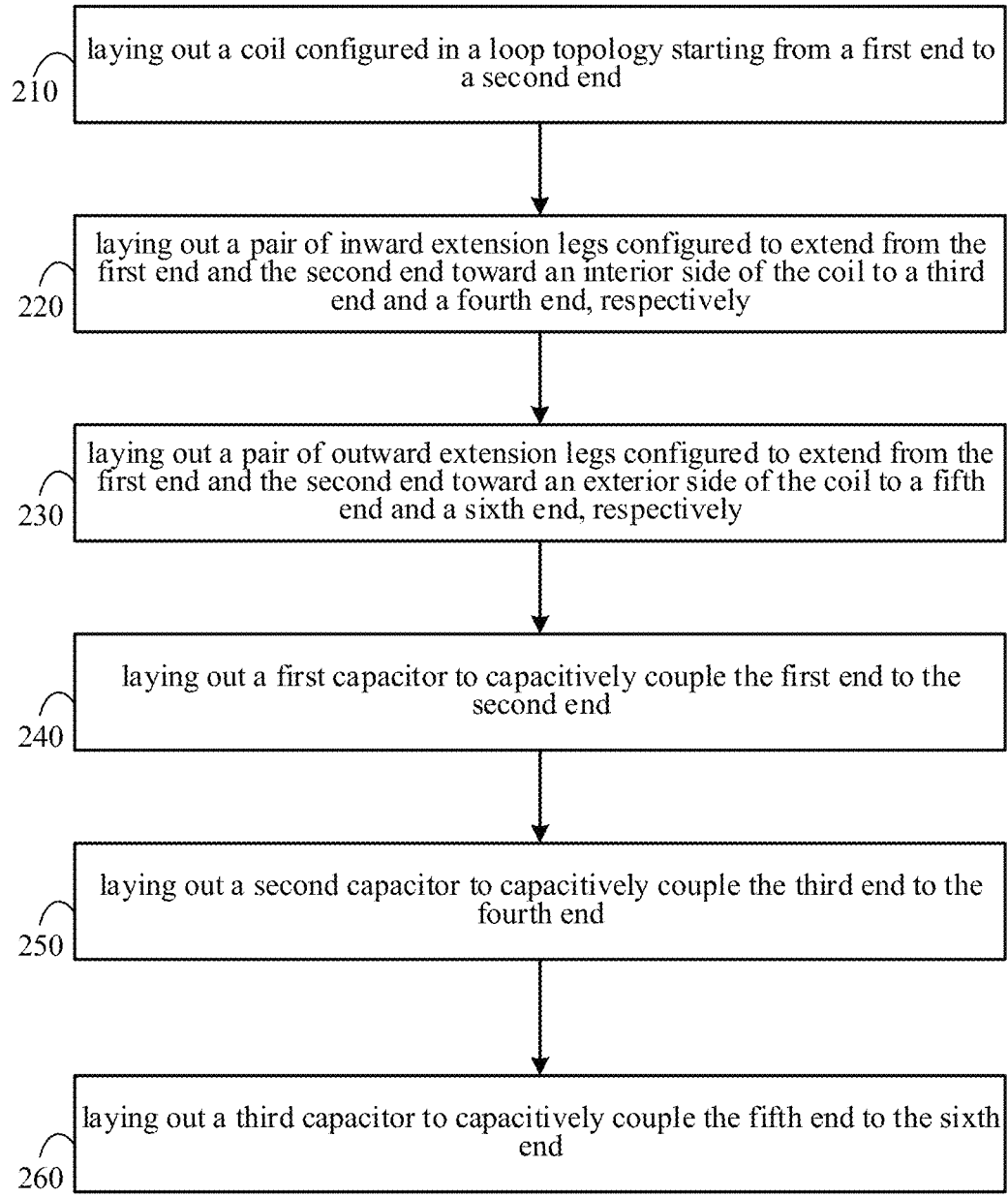
FIG. 2 shows a flow diagram of a method in accordance with an embodiment of the present invention.

A layout of a LC tank 100 in accordance with an embodiment of the present disclosure is shown in FIG. 1. The LC tank 100 comprises: a coil 110 of a loop topology starting from a first end E1 to a second end E2; a pair of inward extension legs 121 and 122 extending from E1 and E2 towards an interior side of the coil 110 to a third end E3 and a fourth end E4, respectively; a pair of outward extension legs 131 and 132 extending from E1 and E2 towards an exterior side of the coil 110 to a fifth end E5 and a sixth end E6, respectively; a first capacitor C1 configured to provide a capacitive coupling between the first end E1 and the second end E2; a second capacitor C2 configured to provide a capacitive coupling between the third end E3 and the fourth end E4; and a third capacitor C3 configured to provide a capacitive coupling between the fifth end E5 and the sixth end E6.

By way of example but not limitation, all the three capacitors C1, C2, and C3 are embodied by using an interdigitated finger topology, as shown in the figure. The coil 110, the pair of inward extension legs 121 and 122, and the pair of outward extension legs 131 and 132 form a distributed inductor, while the first capacitor C1, the second capacitor C2, and the third capacitor C3 form a distributed capacitor. A resonant frequency $f_r$ of the LC tank 100 can be expressed by the following equation:

$$f_r = \frac{1}{2\pi\sqrt{L_e C_e}} \qquad (2)$$

Here, $L_e$ is an effective inductance of said distributed inductor, and $C_e$ is an effective capacitance of said distributed capacitor. The coil 110 constitutes a majority portion of said distributed inductor, and therefore the effective inductance $L_e$ of said distributed inductor is mostly determined by an inductance of the coil 110. At resonance, an energy (which is electric) stored in said distributed capacitor and an energy (which is magnetic) stored in said distributed inductor cyclically exchange with each other. When an energy stored in said distributed capacitor (in form of voltages at the three capacitors) is transferred to said distributed inductor (in form of currents in the coil 110 and the four extension legs 121, 122, 131, and 132), a magnetic energy stored in said distributed inductor is mostly determined by a magnetic field excited by a current of the coil 110. Meanwhile, a current of the pair of inward extension legs 121 and 122 slightly obstructs the magnetic field, but a current of the pair of outward extension legs 131 and 132 slightly enhances the magnetic field. That is, an effect of the inward extension legs 121, 122 and an effect of the outward extension legs 131, and 132 are opposite and offsets one another. As a net result, those four extension legs do not appreciably affect the effective inductance. This alleviates the resonant frequency downshift issue that typically occurs in prior art integrated LC tank circuits.

Although the coil 110 is a single-turn coil, a multi-turn coil can be used. Although the three capacitors C1, C2, and C3 are embodied by using a single-layer interdigitated finger topology, other schemes such as multi-layer interdigitated fingers can be used.

As shown in FIG. 1, the pair of inward extension legs (121 and 122) are noticeably narrower than the coil 110. This helps to reduce a parasitic capacitance of the pair of outward extension legs (121 and 122). While this arrangement is preferred, it is not required. The pair of outward extension legs (131 and 132) are also noticeable narrower than the coil 110. This helps to reduce a parasitic capacitance of the pair of outward extension legs (121 and 122). Again, this arrangement is preferred, but is not required.

In some applications, a tunable LC tank is desired. The LC tank 100 of FIG. 1 can be adapted to become a tunable LC tank by making at least one the three capacitors C1, C2, and C3 variable, or effectively variable per se. For instance, the second capacitor C2 can be replaced by a varactor, which is an embodiment of a variable capacitor. Alternatively, the second capacitor C2 can effectively be made variable by inserting two switches to conditionally connect the second capacitor C2 to the third end E3 and the fourth end E4, respectively, wherein said two switches are controlled by a logical signal. When the logical signal is asserted, the two switches are turned on and the second capacitor C2 is effectively connected (to the third end E3 and the fourth end E4) and enabled to contribute to the effective capacitance $C_e$. When the logical signal is de-asserted, the two switches are turned off and the second capacitor C2 is effectively disconnected (from the third end E3 and the fourth end E4) and does not contribute to effective capacitance $C_e$.

As illustrated by a flow diagram 200 shown in FIG. 1, a method in accordance with an embodiment of the present disclosure comprises: laying out a coil configured in a loop topology starting from a first end to a second end (step 210); laying out a pair of inward extension legs configured to extend from the first end and the second end toward an interior side of the coil to a third end and a fourth end, respectively (step 220); laying out a pair of outward extension legs configured to extend from the first end and the second end toward an exterior side of the coil to a fifth end and a sixth end, respectively (step 230); laying out a first capacitor to capacitively couple the first end to the second end (step 240); laying out a second capacitor to capacitively couple the third end to the fourth end (step 250); and laying out a third capacitor to capacitively couple the fifth end to the sixth end (step 260).

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A device comprises:
    a coil configured in a loop topology starting from a first end and extending to a second end;
    a pair of inward extension legs configured to extend from the first end and the second end toward an interior side of the coil to a third end and a fourth end, respectively;
    a pair of outward extension legs configured to extend from the first end and the second end toward an exterior side of the coil terminating at a fifth end and a sixth end, wherein from a perspective that is orthogonal to a plane containing the coil, the fifth end and sixth end are outside of a perimeter defined by the coil, respectively;
    a first capacitor configured to provide a capacitive coupling between the first end and the second end;
    a second capacitor configured to provide a capacitive coupling between the third end and the fourth end; and
    a third capacitor physically connected to, and extending between, the fifth end and the sixth end, the third capacitor being entirely physically disposed outside of the perimeter and configured to provide a capacitive coupling between the fifth end and the sixth end,
    wherein the collective configuration of the first capacitor, second capacitor, and third capacitor, effectively forms a distributed capacitance.

2. The device of claim 1, wherein the pair of inward extension legs are narrower than the coil.

3. The device of claim 1, wherein the pair of outward extension legs are narrower than the coil.

4. The device of claim 1, wherein at least one of the first, the second, and the third capacitor is of an interdigitated finger topology.

5. The device of claim 1, wherein at least one of the first, the second, and the third capacitor is a variable capacitor.

6. A method comprising:
    laying out a coil configured in a loop topology starting from a first end and extending to a second end;
    laying out a pair of inward extension legs configured to extend from the first end and the second end toward an interior side of the coil to a third end and a fourth end, respectively;
    laying out a pair of outward extension legs configured to extend from the first end and the second end toward an exterior side of the coil terminating at a fifth end and a sixth end, wherein from a perspective that is orthogonal to a plane containing the coil, the fifth end and sixth end are outside of a perimeter defined by the coil, respectively;
    laying out a first capacitor to capacitively couple the first end to the second end;
    laying out a second capacitor to capacitively couple the third end to the fourth end; and
    laying out a third capacitor physically connected to, and extending between, the fifth end and the sixth end, the third capacitor being entirely physically disposed outside of the perimeter and to capacitively couple the fifth end to the sixth end,
    wherein the collective configuration of the first capacitor, second capacitor, and third capacitor, effectively forms a distributed capacitance.

7. The method of claim 6, wherein the pair of inward extension legs are narrower than the coil.

8. The method of claim 6, wherein the pair of outward extension legs are narrower than the coil.

9. The method of claim 6, wherein at least one of the first, the second, and the third capacitor is of an interdigitated finger topology.

10. The method of claim 6, wherein at least one of the first, the second, and the third capacitor is a variable capacitor.

\* \* \* \* \*